March 7, 1933. C. J. PARKER 1,900,613
CLAMP FOR HOLDING DRESSING IN FOWLS AND THE LIKE
Filed April 1, 1932
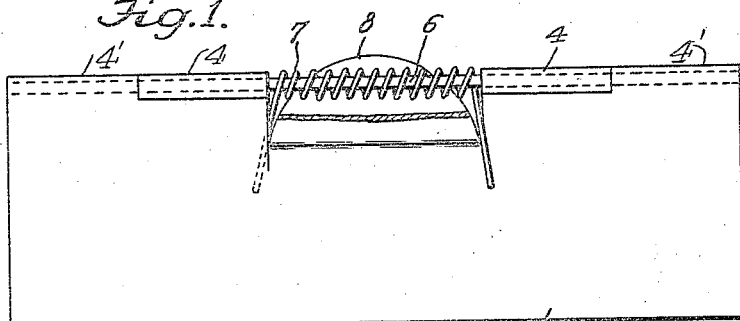
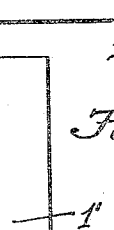
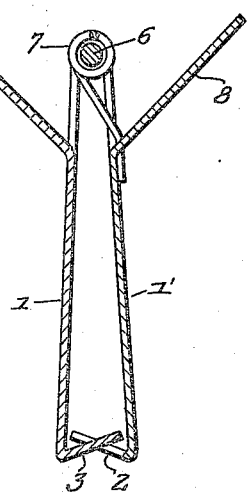
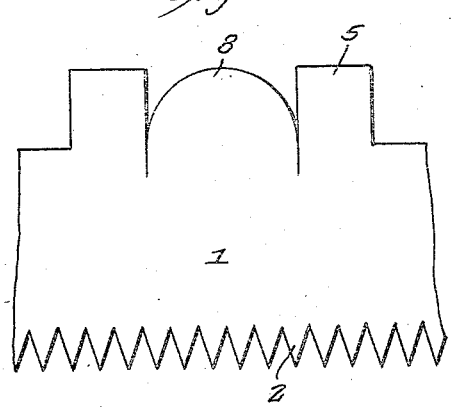
Inventor
Chester J. Parker,
By *Alwrence A. O'Brien*
Attorney Patented Mar. 7, 1933

1,900,613

UNITED STATES PATENT OFFICE

CHESTER JAMES PARKER, OF CARSON CITY, NEVADA

CLAMP FOR HOLDING DRESSING IN FOWLS AND THE LIKE

Application filed April 1, 1932. Serial No. 602,572.

This invention relates to a clamp for holding dressing in fowls and the like, the general object of the invention being to provide a pair of elongated jaw members pivotally connected together and having spring means for causing the members to grip the fowl adjacent the slit therein to hold the dressing within the fowl and thus eliminating the use of stitching or the like now used.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation of the device.

Fig. 2 is a fragmentary bottom plan view.

Fig. 3 is a transverse sectional view.

Fig. 4 is a fragmentary elevation of one of the jaw members before it is bent.

Fig. 5 is a similar view of the other jaw member but omitting most of the teeth 3.

As shown in these views, the device comprises a pair of jaw members 1, 1' each of which is formed with the teeth 2 at its lower edge and said lower edge is bent inwardly as shown at 3 with the teeth intermeshing with each other when the jaws are in closed position as also shown in Figs. 2 and 3. As shown in Fig. 3, the parts 3 are bent beyond right angular position, so that the teeth will cross each other when the jaw members are in closed position, thus enabling them to securely hold the walls of the split in the fowl closed.

Each member 1, 1' is of elongated form and is formed with the barrel portions 4, 4' provided by turning the projections 5, 5' on the upper edge of each jaw member into rolled form as shown. As will be seen the projections 5 of the member 1 are spaced from the ends of said member while the projections 5' of the member 1' are arranged at the ends of said member so that when the projections 5 and 5' are rolled to form the barrels 4 and 4', such barrels will be in alinement with each other. A rod 6 is passed through the barrels for hingedly connecting the members together, and a spring 7 encircles the central part of the rod and has one end engaging the outer face of one of the jaw members and the other end the outer face of the other jaw member so as to normally hold the jaw members in closed position as shown in Fig. 3.

A central part of the upper edge of each jaw member is provided with a rounded part 8 which is bent outwardly to form a handle, so that by grasping these handles and moving them towards each other, the two portions of the jaw members will be moved apart so as to grip fowl or other objects to be dressed adjacent the slit which receives the dressing, and the spring means will hold the device in this gripping position so as to hold the dressing within the fowl.

Thus I have provided simple means for holding dressing in a fowl and eliminate the use of stitching and the like.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A device for holding dressing in fowls and the like comprising a pair of elongated plates having their lower edges bent inwardly beyond a right angular position, said edges being notched to provide teeth, the teeth of one member crossing the teeth of the other member when the jaw members formed by the plates are in closed position, the upper edge of each plate having projections which are rolled to form barrels, a rod passing through the barrels for hingedly connecting the two plates together, the central portion of the upper edge of each plate being extended and bent outwardly to form handles with the hinged rod passing between the handles and a spring encircling the central part of the rod and having its ends engaging the outer faces of the plates for normally holding the teeth in overlapping relation.

In testimony whereof I affix my signature.

CHESTER JAMES PARKER.